United States Patent
Shugg et al.

(10) Patent No.: US 10,113,322 B2
(45) Date of Patent: Oct. 30, 2018

(54) VERTICALLY LAPPED FIBROUS FLOORING

(71) Applicant: Zephyros, Inc., Romeo, MI (US)

(72) Inventors: Colin Shugg, Victoria (AU); John Simmons, Victoria (AU); Brian Perkins, Victoria (AU); Tim Perkins, Victoria (AU)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 15/534,093

(22) PCT Filed: Dec. 8, 2015

(86) PCT No.: PCT/US2015/064478
§ 371 (c)(1),
(2) Date: Jun. 8, 2017

(87) PCT Pub. No.: WO2016/094395
PCT Pub. Date: Jun. 16, 2016

(65) Prior Publication Data
US 2017/0362837 A1    Dec. 21, 2017

Related U.S. Application Data (60) Provisional application No. 62/088,877, filed on Dec. 8, 2014.

(51) Int. Cl.
*E04F 15/20* (2006.01)
*B32B 5/02* (2006.01)
(Continued)

(52) U.S. Cl.
CPC ............ *E04F 15/203* (2013.01); *B32B 5/022* (2013.01); *B32B 5/028* (2013.01); *B32B 7/06* (2013.01);
(Continued)

(58) Field of Classification Search
CPC ..... E04F 15/203; E04F 15/186; E04F 15/182; B32B 5/022; B32B 5/028; B32B 7/12;
(Continued)

(56) References Cited

U.S. PATENT DOCUMENTS 3,061,491 A    10/1962    Sherrard
3,087,571 A    4/1963    Kerwin, Jr.
(Continued)

FOREIGN PATENT DOCUMENTS

AU    782550 B2    1/2001
AU    2005203796 A1    10/2005
(Continued)

OTHER PUBLICATIONS

International Search Report and Written Opinion for International Application No. PCT/US2015/064478, dated Feb. 26, 2016.
(Continued)

*Primary Examiner* — Patricia L. Nordmeyer
(74) *Attorney, Agent, or Firm* — The Dobrusin Law Firm, P.C.

(57) ABSTRACT

A flooring assembly (10) comprising at least one vertically lapped fibrous material layer (14), at least one pressure sensitive adhesive layer (12*a*) including a flexible substrate (12*b*), a mesh (12*c*) and an adhesive (12*d*) located along the flexible substrate, and at least one moisture impermeable membrane layer (16).

20 Claims, 1 Drawing Sheet

(51) Int. Cl.
  *B32B 7/06* (2006.01)
  *B32B 27/36* (2006.01)
  *B32B 13/12* (2006.01)
  *B32B 27/12* (2006.01)
  *B32B 27/32* (2006.01)
  *E04F 15/18* (2006.01)
  *B32B 7/12* (2006.01)

(52) U.S. Cl.
  CPC .............. *B32B 7/12* (2013.01); *B32B 13/12* (2013.01); *B32B 27/12* (2013.01); *B32B 27/32* (2013.01); *B32B 27/36* (2013.01); *E04F 15/182* (2013.01); *E04F 15/186* (2013.01); *B32B 2260/021* (2013.01); *B32B 2260/046* (2013.01); *B32B 2262/0284* (2013.01); *B32B 2307/102* (2013.01); *B32B 2307/5825* (2013.01); *B32B 2307/7265* (2013.01); *B32B 2307/732* (2013.01); *B32B 2307/748* (2013.01); *B32B 2419/04* (2013.01)

(58) Field of Classification Search
  CPC ........... B32B 7/06; B32B 27/12; B32B 27/32; B32B 27/36; B32B 13/12; B32B 2307/732; B32B 2307/102; B32B 2307/5825; B32B 2307/7265; B32B 2307/748; B32B 2260/021; B32B 2260/046; B32B 2262/0284; B32B 2419/04
  See application file for complete search history.

(56) References Cited

U.S. PATENT DOCUMENTS

| | | | |
|---|---|---|---|
| 3,160,549 | A | 12/1964 | Caldwell et al. |
| 3,193,049 | A | 7/1965 | Wollek |
| 3,205,972 | A | 9/1965 | Stricker |
| 3,214,323 | A | 10/1965 | Russell et al. |
| 3,386,527 | A | 6/1968 | Daubert et al. |
| 3,523,859 | A | 8/1970 | Komp |
| 3,642,554 | A | 2/1972 | Hensley |
| 3,899,380 | A | 8/1975 | Pihlstrom |
| 3,978,179 | A | 8/1976 | Sundhauss |
| 3,994,363 | A | 11/1976 | Hirao et al. |
| 4,050,913 | A | 9/1977 | Roach |
| 4,096,007 | A | 6/1978 | Braunling |
| 4,129,675 | A | 12/1978 | Scott |
| 4,131,664 | A | 12/1978 | Flowers et al. |
| 4,152,474 | A | 5/1979 | Cook et al. |
| 4,287,255 | A | 9/1981 | Wong et al. |
| 4,299,223 | A | 11/1981 | Cronkrite |
| 4,392,522 | A | 7/1983 | Bschorr |
| 4,399,851 | A | 8/1983 | Bschorr |
| 4,705,715 | A | 11/1987 | DeCoste, Jr. et al. |
| 4,830,140 | A | 5/1989 | Fridh et al. |
| 4,853,280 | A * | 8/1989 | Poteet .................. D06N 7/0086 428/105 |
| 4,888,234 | A | 12/1989 | Smith et al. |
| 4,988,551 | A | 1/1991 | Zegler |
| 5,004,549 | A | 4/1991 | Woods et al. |
| 5,068,001 | A | 11/1991 | Huassling |
| 5,128,386 | A | 7/1992 | Rehmer et al. |
| 5,298,694 | A | 3/1994 | Thmpson et al. |
| 5,401,567 | A | 3/1995 | Knobloch |
| 5,410,111 | A | 4/1995 | Stief et al. |
| 5,459,291 | A | 10/1995 | Haines et al. |
| 5,492,580 | A | 2/1996 | Frank |
| 5,493,081 | A | 2/1996 | Manigold |
| 5,496,603 | A | 3/1996 | Riedel et al. |
| 5,504,282 | A | 4/1996 | Pizzirusso et al. |
| 5,550,335 | A | 8/1996 | Hielscher |
| 5,560,204 | A | 10/1996 | Ishihama et al. |
| 5,613,942 | A | 3/1997 | Lucas et al. |
| 5,635,270 | A | 6/1997 | Fletcher |
| 5,721,177 | A | 2/1998 | Frank |
| 5,733,824 | A | 3/1998 | Brunka et al. |
| 5,736,470 | A | 4/1998 | Schneberger et al. |
| 5,741,829 | A | 4/1998 | Reich et al. |
| 5,745,434 | A | 4/1998 | Cushman |
| 5,747,131 | A | 5/1998 | Kreckel |
| 5,773,080 | A | 6/1998 | Simmons et al. |
| 5,773,375 | A | 6/1998 | Swan et al. |
| 5,824,973 | A | 10/1998 | Haines et al. |
| 5,832,685 | A | 11/1998 | Hermanson |
| 5,841,081 | A | 11/1998 | Thompson et al. |
| 5,861,348 | A | 1/1999 | Kase |
| 5,866,235 | A | 2/1999 | Fredrick et al. |
| 5,886,306 | A | 3/1999 | Patel et al. |
| 5,906,883 | A | 5/1999 | Blanc-Brude |
| 5,955,174 | A | 9/1999 | Wadsworth et al. |
| 5,968,629 | A | 10/1999 | Masui et al. |
| 5,981,411 | A | 11/1999 | Brown |
| 6,008,149 | A | 12/1999 | Copperwheat |
| 6,048,809 | A | 4/2000 | Brow et al. |
| 6,102,465 | A | 8/2000 | Nemoto et al. |
| 6,103,180 | A | 8/2000 | Haeseker et al. |
| 6,145,617 | A | 11/2000 | Alts |
| 6,165,921 | A | 12/2000 | Nagata et al. |
| 6,198,016 | B1 | 3/2001 | Lucas et al. |
| 6,204,209 | B1 | 3/2001 | Rozek et al. |
| 6,220,388 | B1 | 4/2001 | Sanborn |
| 6,238,761 | B1 | 5/2001 | Jeong et al. |
| 6,244,314 | B1 | 6/2001 | Dodt et al. |
| 6,256,600 | B1 | 7/2001 | Bolton et al. |
| 6,296,075 | B1 | 10/2001 | Gish et al. |
| 6,312,542 | B1 | 11/2001 | Nagata et al. |
| 6,345,688 | B1 | 2/2002 | Veen et al. |
| 6,376,396 | B1 | 4/2002 | Thorn et al. |
| 6,378,179 | B1 | 4/2002 | Hirsch |
| 6,390,563 | B1 | 5/2002 | Haverkamp et al. |
| 6,410,464 | B1 | 6/2002 | Menzies et al. |
| 6,419,729 | B1 | 7/2002 | Duffy et al. |
| 6,429,154 | B1 | 8/2002 | Trotter |
| 6,495,229 | B1 | 12/2002 | Carte et al. |
| 6,514,889 | B1 | 2/2003 | Theoret et al. |
| 6,524,691 | B2 | 2/2003 | Sugawara et al. |
| 6,534,145 | B1 | 3/2003 | Boyles |
| 6,541,105 | B1 | 4/2003 | Park |
| 6,598,636 | B1 | 7/2003 | Schumann et al. |
| 6,755,483 | B2 | 6/2004 | Yukawa et al. |
| 6,821,597 | B1 | 11/2004 | Price et al. |
| 6,913,718 | B2 | 7/2005 | Ducker et al. |
| 7,201,253 | B2 | 4/2007 | Duval et al. |
| 7,226,656 | B2 | 6/2007 | Coates et al. |
| 7,470,339 | B2 | 12/2008 | Hoffmann et al. |
| 7,514,026 | B1 | 4/2009 | Zafiroglu |
| 7,757,810 | B2 | 7/2010 | Sparks et al. |
| 7,757,811 | B2 | 7/2010 | Fox et al. |
| 7,867,601 | B2 | 1/2011 | Ikishima et al. |
| 8,153,219 | B2 | 4/2012 | Hooft |
| 8,365,862 | B2 | 2/2013 | Coates et al. |
| 8,534,419 | B2 | 9/2013 | Coates et al. |
| 2001/0000162 | A1 | 4/2001 | Fletemier et al. |
| 2001/0015249 | A1 | 8/2001 | Mohr |
| 2001/0023008 | A1 | 9/2001 | Offermann et al. |
| 2002/0011306 | A1 | 1/2002 | Hannington et al. |
| 2002/0015842 | A1 | 2/2002 | Yanagiuchi |
| 2002/0033215 | A1 | 3/2002 | Aoki |
| 2003/0066708 | A1 | 4/2003 | Allison et al. |
| 2003/0068943 | A1 | 4/2003 | Fay |
| 2003/0099810 | A1 | 5/2003 | Allison et al. |
| 2003/0188817 | A1 | 10/2003 | Yukawa et al. |
| 2004/0021247 | A1 | 2/2004 | Habisreitinger et al. |
| 2004/0077738 | A1 | 4/2004 | Field et al. |
| 2004/0111817 | A1 | 6/2004 | Chen et al. |
| 2004/0116022 | A1 * | 6/2004 | Langley .................. A41D 31/02 442/289 |
| 2004/0131836 | A1 | 7/2004 | Thompson |
| 2004/0173298 | A1 | 9/2004 | Boiocchi et al. |
| 2004/0176003 | A1 | 9/2004 | Yang et al. |
| 2004/0180177 | A1 | 9/2004 | Ray et al. |
| 2004/0180592 | A1 | 9/2004 | Ray |
| 2004/0192145 | A1 | 9/2004 | Theoret et al. |
| 2004/0231915 | A1 | 11/2004 | Thompson, Jr. et al. |

(56) References Cited

U.S. PATENT DOCUMENTS

| | | |
|---|---|---|
| 2004/0238275 A1 | 12/2004 | Keller et al. |
| 2005/0026527 A1* | 2/2005 | Schmidt ............... B29C 43/222 |
| | | 442/381 |
| 2005/0084641 A1 | 4/2005 | Downs et al. |
| 2005/0211358 A1 | 9/2005 | Tanno |
| 2005/0260913 A1* | 11/2005 | Doesburg ................. B32B 5/26 |
| | | 442/370 |
| 2006/0090958 A1 | 5/2006 | Coates et al. |
| 2006/0105664 A1 | 5/2006 | Zafiroglu |
| 2006/0124387 A1 | 6/2006 | Berbner et al. |
| 2006/0137799 A1 | 6/2006 | Haque et al. |
| 2006/0289230 A1 | 12/2006 | Connelly et al. |
| 2006/0289231 A1 | 12/2006 | Priebe et al. |
| 2007/0190871 A1 | 8/2007 | Patel |
| 2007/0277948 A1 | 12/2007 | Carbo et al. |
| 2008/0001431 A1 | 1/2008 | Thompson et al. |
| 2008/0050565 A1 | 2/2008 | Gross et al. |
| 2008/0064794 A1 | 3/2008 | Murdock et al. |
| 2008/0073146 A1 | 3/2008 | Thompson et al. |
| 2008/0166940 A1 | 7/2008 | Nunn et al. |
| 2008/0233348 A1 | 9/2008 | Ishiwatari et al. |
| 2008/0251187 A1 | 10/2008 | Haque et al. |
| 2008/0296087 A1 | 12/2008 | Tanaka et al. |
| 2008/0311363 A1 | 12/2008 | Haskett et al. |
| 2009/0071322 A1 | 3/2009 | Oxford et al. |
| 2009/0148644 A1 | 6/2009 | Francis |
| 2009/0162595 A1 | 6/2009 | Ko et al. |
| 2009/0255619 A1 | 10/2009 | Tong |
| 2010/0000640 A1 | 1/2010 | Kierzkowski et al. |
| 2010/0021667 A1 | 1/2010 | Yanagawa |
| 2010/0168286 A1 | 7/2010 | Gladfelter et al. |
| 2010/0270101 A1 | 10/2010 | Yukawa |
| 2010/0304109 A1 | 12/2010 | Schilling et al. |
| 2011/0004414 A1 | 1/2011 | McKim |
| 2011/0070794 A1 | 3/2011 | Gladfelter |
| 2011/0082386 A1 | 4/2011 | Sheraton, Sr. |
| 2011/0139543 A1 | 6/2011 | Coates et al. |
| 2011/0159236 A1 | 6/2011 | Nakae et al. |
| 2011/0226547 A1 | 9/2011 | Kühl et al. |
| 2011/0274921 A1 | 11/2011 | Li et al. |
| 2011/0293911 A1 | 12/2011 | Coates et al. |
| 2012/0024626 A1 | 2/2012 | Coates et al. |
| 2012/0037447 A1 | 2/2012 | Deval et al. |
| 2012/0058289 A1 | 3/2012 | Coates et al. |
| 2013/0112499 A1 | 5/2013 | Kitchen et al. |
| 2013/0192921 A1 | 8/2013 | Coates et al. |
| 2013/0327590 A1 | 12/2013 | Grube et al. |
| 2015/0364730 A1 | 12/2015 | Glaspie |
| 2018/0047380 A1* | 2/2018 | Bush .................... G10K 11/168 |

FOREIGN PATENT DOCUMENTS

| | | |
|---|---|---|
| CA | 2350477 A1 | 5/2000 |
| CA | 2421458 A1 | 4/2004 |
| DE | 6930307 U | 12/1969 |
| DE | 19508335 A1 | 11/1995 |
| DE | 4424328 A1 | 1/1996 |
| DE | 10345575 B3 | 1/2005 |
| DE | 102004016934 A1 | 10/2005 |
| DE | 19714348 A1 | 2/2008 |
| DE | 102011079413 A1 | 1/2013 |
| EP | 0607946 B1 | 7/1994 |
| EP | 0909680 A1 | 4/1999 |
| EP | 0911185 A2 | 4/1999 |
| EP | 0949066 A2 | 10/1999 |
| EP | 1577123 B1 | 9/2005 |
| EP | 1640207 A1 | 3/2006 |
| EP | 1775714 A1 | 4/2007 |
| EP | 2312073 A1 | 4/2011 |
| GB | 823203 A | 11/1959 |
| GB | 2079626 A | 1/1982 |
| GB | 2322862 A | 9/1998 |
| GB | 2421251 A | 6/2006 |
| JP | S56-38080 A | 9/1982 |
| JP | S60-137528 U | 9/1985 |
| JP | 63-11541 U | 1/1988 |
| JP | 02302484 A | 12/1990 |
| JP | H05-113020 A | 7/1993 |
| JP | 7266802 A | 10/1995 |
| JP | H08-223855 A | 8/1996 |
| JP | H10-121597 A | 5/1998 |
| JP | H10-156994 A | 6/1998 |
| JP | H10148909 A | 6/1998 |
| JP | H11508328 A | 7/1998 |
| JP | H10237978 A | 9/1998 |
| JP | H10-273900 A | 10/1998 |
| JP | H100280259 A | 10/1998 |
| JP | 2000-310023 A | 7/2000 |
| JP | 2001-228879 A | 8/2001 |
| JP | 2001-348540 A | 12/2001 |
| JP | 2002-052634 A | 2/2002 |
| JP | 2002-067608 A | 3/2002 |
| JP | 2004-107605 | 8/2004 |
| JP | 2004-291549 A | 10/2004 |
| JP | 2005036364 A | 2/2005 |
| JP | 2005076144 A | 3/2005 |
| JP | 2006104298 A | 4/2006 |
| JP | 2006143867 A | 6/2006 |
| JP | 2006160197 A1 | 6/2006 |
| JP | 2006193838 A | 7/2006 |
| JP | 2006273909 A | 10/2006 |
| JP | 2007025044 A | 1/2007 |
| JP | 2007-512990 A | 5/2007 |
| JP | 2007223273 A | 6/2007 |
| JP | 2008/068799 A | 3/2008 |
| JP | 2008/132972 A | 6/2008 |
| WO | 8809406 A1 | 12/1988 |
| WO | 93/23596 A1 | 11/1993 |
| WO | 94/03343 A1 | 2/1994 |
| WO | 95/25634 A1 | 9/1995 |
| WO | 97/00989 A1 | 1/1997 |
| WO | 97/04445 A1 | 2/1997 |
| WO | 98/18656 A1 | 5/1998 |
| WO | 98/38370 A1 | 9/1998 |
| WO | 98/53444 A1 | 11/1998 |
| WO | 99/619663 A1 | 12/1999 |
| WO | 0027671 A1 | 5/2000 |
| WO | 2000/032142 A1 | 6/2000 |
| WO | 00/53456 A1 | 9/2000 |
| WO | 2001/019306 A1 | 3/2001 |
| WO | 02/09089 A1 | 1/2002 |
| WO | 02085648 A1 | 10/2002 |
| WO | 02098643 A2 | 12/2002 |
| WO | 2003/000976 A1 | 1/2003 |
| WO | 03069596 A1 | 8/2003 |
| WO | 03074267 A1 | 9/2003 |
| WO | 03/097227 A1 | 11/2003 |
| WO | 2005/081226 A1 | 9/2005 |
| WO | 20006/107847 A2 | 10/2006 |
| WO | 2007/125830 A1 | 8/2007 |
| WO | 2009/039900 A1 | 4/2009 |
| WO | 2010/042995 A1 | 4/2010 |
| WO | 2010/063079 A1 | 6/2010 |
| WO | 2010/094897 A2 | 8/2010 |
| WO | 2012/038737 A1 | 3/2012 |
| WO | 2017028962 A1 | 2/2017 |

OTHER PUBLICATIONS

Acoustic Textiles—Lighter, Thinner and More Sound-Absorbent, Technical Textiles International, International Newsletters, dated Sep. 2002, pp. 15-18.
Bies Reference 1 of 7; Engineering Noise Control Theory and Practice; $3^{rd}$ Edition (2003).
Bies Reference 2 of 7; Engineering Noise Control Theory and Practice; $3^{rd}$ Edition (2003).
Bies Reference 3 of 7; Engineering Noise Control Theory and Practice; $3^{rd}$ Edition (2003).
Bies Reference 4 of 7; Engineering Noise Control Theory and Practice; $3^{rd}$ Edition (2003).
Bies Reference 5 of 7; Engineering Noise Control Theory and Practice; $3^{rd}$ Edition (2003).

(56) References Cited

OTHER PUBLICATIONS

Bies Reference 6 of 7; Engineering Noise Control Theory and Practice; $3^{rd}$ Edition (2003).
Bies Reference 7 of 7; Engineering Noise Control Theory and Practice; $3^{rd}$ Edition (2003).
DECI-TEX 3D, URL=http://web.archive.org/web/20070830042658 http://www.inccorp.com.au/page/deci_tex_3d.html#top, including nine (9) documents from links therein, download date Aug. 26, 2011.
Natural Fiber Based Lightweight Sound Absorber Materials, SAE Technical Paper Series, Jeffrey S. Hurley, Buckeye Technologies Inc., dated May 2007.
Notes on Sound Absorption Technology, Uno Ingard (1994).

* cited by examiner

VERTICALLY LAPPED FIBROUS FLOORING

FIELD

The present teachings relate generally to acoustic flooring assemblies comprising a vertically lapped fibrous material layer and optionally one or more pressure sensitive adhesive (PSA) layers and/or moisture barriers.

BACKGROUND

Common flooring systems include a subfloor of poured concrete or plywood and a finished floor, generally comprising a wood material. Various assemblies are located between the subfloor and the finished floor to reduce sound transmission. Generally, these assemblies include the use of one or more of foams, glass fiber insulation, polymeric mats, liquid adhesives and/or solvents. Such assemblies can be time consuming and labor intensive to install. Some can also lead to undesirable, added thickness.

The inexpensive method of installation currently consists of laying down a foam product and then applying the flooring directly on top. This is known as a 'floating floor' and no adhesive is used in this process. While inexpensive, the 'tap' of the footfall doesn't give the desired sound, it is often too high frequency and not the lower frequency 'clunk' that is heard when stepping onto a flooring system that is direct fixed.

The second, more expensive method of installation requires the use adhesive to bond a rubber matting to the concrete slab, then another layer of adhesive is placed on top of the matting and then the flooring on top. The method is far more costly and time consuming but gives the preferred sound on footfall over the floating floor application.

There is thus a need to develop acoustic flooring materials that provide simplified, quick installation and avoid liquid materials, foam and solvents. There is a further need for flooring materials that provide the desired sound damping, while maintaining low cost and ease of installation.

SUMMARY

The present teachings provide for a flooring assembly comprising at least one vertically lapped fibrous material layer, at least one PSA layer including a flexible substrate, a mesh and an adhesive located along the flexible substrate and at least one moisture impermeable membrane layer. The flooring assembly may include at least one of the above-described layers, at least two of the above-described layers, at least 3 of the above-described layers, or even at least four of the above-described layers.

The fibers may be thermoplastic fibers. The flooring assembly may include a concrete layer located beneath all other layers. The flooring assembly may include a composite layer located above all other layers. The flooring assembly may include at least two PSA layers. The flooring assembly may include a first PSA layer located in direct planar contact with a first surface of the at least one vertically lapped fibrous material layer. The flooring assembly may include a second PSA layer located in direct planar contact with a second surface of the at least one moisture impermeable membrane layer. The flooring assembly may include exactly one vertically lapped fibrous material layer. The flooring assembly may include exactly one moisture impermeable membrane layer. The at least one moisture impermeable membrane later may be located in direct planar contact with the at least one vertically lapped fibrous material layer.

The flooring assembly may comprise exactly one vertically lapped fibrous material layer. The flooring assembly may include exactly one moisture impermeable membrane layer located in direct planar contact with a second surface of the vertically lapped fibrous material layer. The flooring assembly may include a first PSA later located in direct planar contact with a first surface of the vertically lapped fibrous material layer. The flooring assembly may include a second PSA layer located in direct planar contact with a second surface of the moisture impermeable membrane layer.

The thickness of the vertically lapped fibrous material layer may be at least about 0.5 mm and less than about 10 mm. The thickness of the vertically lapped fibrous material layer may be at least about 2 mm and less than about 5 mm. The density of the vertically lapped fibrous material layer may be at least about 100 g/m$^2$ and less than about 800 g/m$^2$. The vertically lapped fibrous material layer may comprise a polyethylene terephthalate material. The PSA layer may comprise a UV cured adhesive. The at least one PSA layer may include a release liner. The flooring assembly may be substantially free of any liquid adhesive. The moisture impermeable membrane layer, the release liner, or both may comprise a polyamide, a polyolefin (e.g., polyethylene, polypropylene, or otherwise), a polycarbonate, a polyester (e.g., polyethylene terephthalate), an epoxy based material, a thermoplastic polyurethane, or any combination thereof. The moisture impermeable membrane layer may comprise a low density polyethylene material. The release liner may comprise a high density polyethylene material. The at least one PSA layer may adhere to any adjacent layer without use of any solvent. The at least one PSA layer may have a high loss factor such that the overall loss factor of the assembly is higher than that of the at least one vertically lapped fibrous material layer by itself. The vertically lapped fibrous material layer may be a thermally bonded material. The assembly may be substantially free of any foam material. The at least one moisture impermeable membrane layer may comprise a polymeric material. The at least one moisture impermeable membrane layer may have a thickness of at least about 50 μm and less than about 1000 μm. The at least one moisture impermeable membrane layer may have a thickness of at least about 100 μm and less than about 400 μm. The flooring assembly may be manufactured as a roll that can be unrolled during use. The flooring assembly may provide acoustic damping. The flooring assembly may be applied in between a concrete slab and a floor. The floor may be a wood floor.

The teachings herein further envision a method for assembling a floor comprising providing a first PSA layer having a first surface and an opposing second surface and locating a vertically lapped fibrous material layer in direct planar contact with the second surface of the first PSA layer, the vertically lapped fibrous material layer having a first surface in contact with the first PSA layer and a second opposing surface. The method may further include locating a moisture impermeable membrane layer in direct planar contact with the second surface of the vertically lapped fibrous material layer, and also locating a second PSA layer in direct planar contact with a second surface of the moisture impermeable membrane layer.

The method of may include forming the vertically lapped fibrous material of a non-woven preformed web. The method may include locating a release liner onto each of the first and second PSA layers. The method may include peeling the release liner from one or more of the first and second PSA layers. The method may include forming the first and second PSA layers by locating an adhesive in an intermittent or continuous pattern on a substrate. The method may include locating a mesh material onto the substrate and adhesive layers. The method may include locating the second PSA layer indirect planar contact with a concrete layer. The method may include preventing moisture from travelling from the concrete layer to the vertically lapped fibrous material layer by means of the moisture impermeable membrane layer. The method may include forming portions of the PSA layers that are free of adhesive. One or more portions of the PSA layers that are free of the adhesive may form locations for lifting a release layer from the PSA layers. The method may include exposing the first and second PSA layers to a UV light source.

The method may be free of any step of applying a liquid adhesive. The method may be free of any step of applying a foam layer. The method may be free of any step of comprising a solvent.

The present teachings provide for a flooring assembly that provides sound damping while avoiding foams, liquid adhesives and solvents required for typical flooring assemblies. The lack of foams and liquid adhesives combined with the use of PSA substrates allows for simplified and quick installation of the flooring assembly.

DETAILED DESCRIPTION

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present application claims the benefit of the filing date of U.S. Provisional Application No. 62/088,877, filed Dec. 8, 2014, the entirety of the contents of this application being hereby incorporated by reference herein for all purposes.

Figure 1:
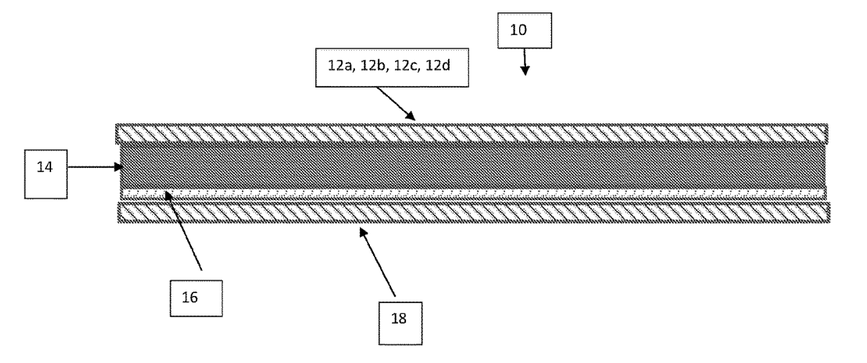
FIG. 1 is an exemplary flooring assembly in accordance with the present teachings.

As shown for example, at FIG. 1, the flooring assembly 10 includes a first PSA layer 12a (including a flexible substrate 12b, a mesh 12c and an adhesive 12d), located in direct planar contact with a vertically lapped fibrous material layer 14. A moisture impermeable membrane layer 16 may be located in direct planar contact with the vertically lapped fibrous material 14, along the surface of the fibrous material layer that does not contact the PSA layer 12. A second PSA layer 18 may then be located in direct planar contact with the moisture impermeable membrane layer 16.

The flooring assemblies described herein may be located so that the layers provide sufficient acoustic damping. The assemblies may be provided as part of a subfloor, just below a finished floor, onto a concrete subfloor or any combination of these. The flooring assembly may be located below a composite flooring material. The flooring assemblies may include any number of the layers described herein and each layer may only be included once or may be included in multiple locations throughout the assembly. The assembly may include PSA layers located on both external surfaces of the flooring assembly such that the assembly can be quickly adhered to one or more desired surfaces. The flooring assembly may include one or more moisture impermeable layers so as to protect the fibrous material layer from moisture that commonly exists on concrete subfloors.

The vertically lapped fibrous material layer may be a nonwoven material, which may be a thermoformable short fiber nonwoven (TSFNW) material, comprising at least some short fibers formed which may be formed from recycled waste material. In the context of the present teachings, the term "thermoformable short fiber nonwoven" as used herein, is intended to indicate a nonwoven material that may be formed with a broad range of densities and thicknesses and that contains a thermoplastic and/or thermoset binder. The TSFNW material may be heated and thermoformed into a specifically shaped "thermoformed product".

The use of short fibers may be advantageous in thermoformable materials due to the inherent "thermal memory" of fibrous materials. During processing, fibers may be heated in order to conform them to the desired geometry for the nonwoven material. However, when the material is reheated, such as during use, the fibers may distort and revert to a geometry closer to the one they had prior to initial processing as a result of the fibers' "thermal memory". In longer fibers, such as conventional staple fibers, the overall displacement that may occur due to thermal memory distortion is larger than that of shorter fibers, as the tendency to revert and distort is a function of the fiber's length. Accordingly, a TSFNW material may have greater temperature stability than a nonwoven material using fibers having a longer length.

TSFNW materials may also require less binder than similar materials having longer fibers therein. In materials having longer fibers, additional binder materials may be needed to mitigate the effects of thermal memory distortion by constraining the fibers in the desired geometry. Thus, short fiber-based materials may require less binder because comparatively less thermal memory displacement occurs in shorter fibers. Accordingly, TSFNW materials in accordance with the teachings herein may require less binder to achieve a desired product geometry when compared to thermoformable nonwoven materials comprising long fibers. The TSFNW materials may also be more lightweight than nonwoven materials formed of fibers having a long length. In addition, thermoforming of TSFNW materials may be performed more efficiently as compared to long fibers, as less material may have to be heated. As a result, less energy may be required to heat the material to the temperature necessary for thermoforming.

Fibers utilized in the vertically lapped fibrous material layer as described herein may have a low thickness (or linear density), such as below 2 denier. Fibers may have a moderate thickness (or linear density), such as 2 to 25 denier, or even 12 to 18 denier. Fibers may have a coarse thickness (or linear density), such as that found in carpet fibers and in some industrial textiles. In general, the fiber diameter is selected based upon the desired properties of the nonwoven material produced using the short fibers. For example, the fiber diameter may be selected based upon the desired air flow resistance or air flow resistivity of the resulting material, where air flow resistance is the air pressure difference across the material divided by the volume velocity of air flow through the material, and the air flow resistivity is the air flow resistance divided by the thickness of the material.

At least some of the materials used to form the vertically lapped fibrous material layer may comprise thermoplastic materials, such as polyethylene terephthalate (PET), various co-polyester materials (CoPET), polypropylene (PP), polyethylene (PE), polyamide (PA), ethylene vinyl acetate (EVA), or combinations thereof. The vertically lapped fibrous material layer may comprise other man-made fiber that does not exhibit thermoplastic behavior, such as poly aramid fibers, meta aramid fibers, or blends of such fibers. The vertically lapped fibrous material layer may further comprise a proportion of natural fibers such as cotton, wool, hemp, combinations thereof and the like. The proportion of natural fibers used in producing the vertically lapped fibrous material layer may be dependent upon the desired application of the vertically lapped fibrous material layer material. For example, in some embodiments a proportion of wool may be included in the vertically lapped fibrous material layer material to impart flame retardant properties to the vertically lapped fibrous material layer material, for example about 20 wt. % or more of the total mass of the vertically lapped fibrous material layer material. In some embodiments, it may be desirable to include up to 90 wt. % of natural fibers in the vertically lapped fibrous material layer material. The material may contain adhesive thermoplastic fibers.

In embodiments using short fibers that are not thermoplastic in character to form the vertically lapped fibrous material layer, such as wool, a thermoplastic binder may be added to the vertically lapped fibrous material layer and/or a precursor web of vertically lapped fibrous material, for example in the form of a powder or fibers. The thermoplastic fibers may also be short fibers that are optionally recycled. Greater proportions of thermoplastic binder may be added to the vertically lapped fibrous material layer to produce nonwoven materials having smaller pores and fewer voids within the material. As the proportion of binder increases and the void spaces within the material reduce further, the material produced may become more like a short fiber reinforced plastic sheet than a nonwoven textile.

In some embodiments, plasticized polyvinyl chloride (PVC) or thermoplastic polyurethane (PU) may be used as the thermoplastic binder to produce a nonwoven material having PVC- or PU-coated fibers. The source of the PVC or PU may be the fibrous material used to produce the vertically lapped fibrous material layer.

The vertically lapped fibrous material layer may be formed as a fibrous web onto a pre-manufactured low density nonwoven material such as, for example, a porous bulk absorber to form a composite material with variable air flow resistivity through the thickness of the material. However, following heating and compression to consolidate the web, the nonwoven material including the pre-manufactured low density preformed web may be converted into a high density nonwoven material, such as, for example a porous limp sheet. The porous limp sheet formed may be utilized together with another porous bulk absorber, which may or may not be in accordance with the other embodiments described herein, to also form a composite product. In embodiments where the bulk absorber and the limp sheet are both TSFNW materials, the composite material may also be thermoformable. In some embodiments, the porous bulk absorber may be attached to one side of the porous limp sheet during molding and thermoforming. In another embodiment, the porous bulk absorber may be attached to one side of the limp sheet prior to molding. The porous bulk absorber may also be applied to more than one side of the limp sheet.

In some embodiments, a facing can be added to the top of the vertically lapped fibrous material layer. The facing material can comprise the compositions discussed above and may include fabric such as nonwoven material, a film material or the moisture impermeable membrane layer. The facing materials may optionally be mechanically attached together or may be laminated with an adhesive In some embodiments, the nonwoven material may pass through a combination of two or more processes, and may be laminated with various facings on one or both sides, or compacted, or both. A typical laminator may not have the capability of compressing the material sufficiently for production purposes, so it is contemplated that other methods of compaction, such as at least one set of heated calender rolls or a series of calender rolls, may be used. An exemplary set of calender rolls may be produced with 2 rolls, 3 rolls, or more. It is possible for the nonwoven material to pass through the calender rolls by "direct" passing, which is common in standard applications and light webs, or it is further contemplated that the material can pass through the calender rolls through an "S" sequence in order to give the maximum heating time.

A nonwoven material may be formed to have a thickness and density selected according to the required physical and air permeability properties desired of the finished nonwoven material. The density of the nonwoven material may depend, in part, on the specific gravity of any additives incorporated into the nonwoven material, and/or the proportion of the final nonwoven material that the additives constitute.

The vertically lapped fibrous material layer may be designed to have a low density, with a finished thickness of at least about 1.5 mm and less than about 350 mm. The thickness may alternatively be at least about 4 mm and less than about 250 mm, at least about 5 mm and less than about 150 mm, at least about 6 mm and less than about 75 mm, or at least about 8 mm and less than about 50 mm. According to some of these embodiments, the vertically lapped fibrous material layer may be formed as a relatively thick, low density nonwoven, with a bulk density of at least about 10 $kg/m^3$ and less than about 200 $kg/m^3$, or at least about 15 $kg/m^3$ and less than about 100 $kg/m^3$, or at least about 20 and less than about 60 $kg/m^3$. The vertically lapped fibrous material layer thus formed may have an air flow resistivity of at least about 400 Rayls/m and less than about 200,000 Rayls/m. Alternatively, the vertically lapped fibrous material layer may have an air flow resistivity of at least about 800 and less than about 150,000 Rayls/m, or at least about 1,000 and less than about 100,000 Rayls/m.

According to other embodiments, the vertically lapped fibrous material layer may be formed with a relatively high density and/or exhibit a relatively high air flow resistance. Such a vertically lapped fibrous material layer may be formed to have a thickness of at least about 0.1 mm and less than about 5 mm, though it is contemplated that these high density materials may have greater thicknesses (e.g., greater than about 20 mm). The thickness may alternatively be at least about 0.25 mm and less than about 4 mm, or at least about 0.3 mm and less than about 3 mm, or at least about 0.4 mm and less than about 2.5 mm. A vertically lapped fibrous material layer formed in such a manner may have a bulk density of at least about 200 kg/m$^3$ and less than about 1,000 kg/m$^3$. The bulk density may be as high as 2000 kg/m$^3$. Alternatively, the bulk density may be at least about 250 kg/m$^3$ and less than about 800 kg/m$^3$, or possibly at least about 300 and less than about 600 kg/m$^3$.

The vertically lapped fibrous material layer may be formed to have an air flow resistivity of at least about 275,000 Rayls/m and less than about 3,000,000 Rayls/m. Alternatively, the air flow resistivity may be at least about 1,000,000 Rayls/m and less than about 1,500,000 Rayls/m, or at least about 1,250,000 Rayls/m and less than about 1,400,000 Rayls/m. For example, a 3 mm thick material may have an air flow resistance of 6,000 Rayls if the air flow resistivity is 2,000,000 Rayls/m, or 3,000 Rayls at 1,000,000 Rayls/m, or 2,100 Rayls at 700,000 Rayls/m. Each of these exemplary materials may constitute a very effective acoustic material under certain circumstances, and the vertically lapped fibrous material layer should be selected so as to provide the correct range of air flow resistivity for the desired acoustic effect.

The vertically lapped fibrous material layer may comprise short fibers formed to generally have a length of at least about 0.5 mm to less than about 12 mm, or at least about 1 mm to less than about 6 mm. Alternatively, the average fiber length of the short fibers may be less than about 12 mm, less than about 6 mm, less than about 2 mm, or at least about 2 mm to less than about 5 mm. The short fibers may comprise a polyester material, such as a polyethylene terephthalate (PET) material, for example.

Air flow resistance is measured for a particular material at a particular thickness. The air flow resistance is normalized by dividing the air flow resistance (in Rayls) by the thickness (in meters) to derive the air flow resistivity measured in Rayls/m. ASTM standard C522-87 and ISO standard 9053 refer to the methods for determination of air flow resistance for sound absorption materials. Within the context of the described embodiments, air flow resistance, measured in mks Rayls, will be used to specify the air flow resistance; however other methods and units of measurement are equally valid. Within the context of the described embodiments, air flow resistance and air flow resistivity can be assumed to also represent the specific air flow resistance, and specific air flow resistivity, respectively.

Acoustic materials for sound absorption may have a relatively high air flow resistance to present acoustic impedance to the sound pressure wave incident upon the material. Air permeability should be managed to ensure predictable and consistent performance and this is achieved through management of fiber sizes, types and lengths, among other factors. For this reason, a homogeneous, short fiber nonwoven vertically lapped material may be desirable.

The one or more PSA layers may include an acrylic resin that is curable under ultraviolet light, such as AcResin® DS 3583 available from BASF of Germany. Some suitable acrylic resins are described in U.S. Pat. Nos. 5,128,386 and 5,741,829, incorporated by reference herein for all purposes. The PSA substance may be applied to substrate which may be a film substrate. The substrate may have a thickness of about 10 to about 150 microns, for example. The thickness may alternatively be from about 20 to about 100 microns, and possibly from about 30 to about 75 microns, for example.

Other types of PSA substances of varying thicknesses may also be used, as well as PSA substances that can be cured under different conditions, whether as a result of irradiation or another curing method. For example, the PSA substance may comprise a hot-melt synthetic rubber-based adhesive or a UV-curing synthetic rubber-based adhesive. The PSA coating may be applied as a hot-melt or water-based, for example. For UV-cured hot-melt adhesive, the adhesive can be applied at a relatively low temperature that is compatible with a relatively low melting point substrate. The subsequent UV curing serves to cross-link the adhesive for high temperature resistance, without overheating the substrate.

One purpose of the substrate is to act as a carrier for the PSA substance so that the PSA substance can be applied (adhered) to one or more of the vertically lapped fibrous material layer, the moisture impermeable membrane layer, or alternatively a concrete subfloor surface or finished floor surface. The PSA layers may include one or more substrate layers and one or more of those substrate layers may be a handling layer such that it is removed, leaving the PSA substance exposed on the side where the substrate used to be. The newly exposed face of the PSA substance can be applied to a target surface, which may be of the vertically lapped fibrous material layer, the moisture impermeable membrane layer, or alternatively a concrete subfloor surface or finished floor surface, to adhere the PSA layer to the target surface.

Depending on the size and spacing of the applied portions of the intermittent or continuous PSA coating, the percentage of coated area can be varied. The applied area of the coating can vary between 10% and 100% of the area of the substrate. The PSA coating may be applied in strips, and the spacing of the strips may vary depending on the nature of the surface to which the PSA layers will be adhered to. A wider spacing or gap between the strips may facilitate easier removal of the substrate.

By applying the adhesive in an intermittent pattern, such as longitudinal strips, it is possible to still achieve the coating weight desired for a particular application, while saving a large percentage of the PSA resin by coating only some portions of the total area. In particular, the described embodiments have been developed to use a reduced amount of PSA substance on lightweight and porous target articles that do not require an all-over coating.

The intermittent or continuous coating may be applied to a suitable substrate that acts as a release liner. The substrate may include paper, coated paper, and filmic release liners. The release liner may be silicone coated, however other types and forms of release coating can also be used.

The PSA layers may be wound prior to use for later application to one or more of the layers identified herein. The PSA layers may alternatively be laminated in-line to one or more of the layers identified herein. The PSA layers can be unwound onto another substrate, or onto one or more of the layers identified herein. The unwound PSA layer, whether attached to an additional layer or not, may be die-cut to a desired size and shape.

For even further ease of use, the substrate can be formed to have relatively high tear strength so that it can be removed in one piece. Depending upon the material used for the substrate, it may have a thickness between about 15 microns and 150 microns. The substrate may comprise a polyethylene (PE) (which may be a high density polyethylene (HDPE)), polypropylene (PP), polyethylene terephthalate (PET) or similar plastic film. A polyethylene-based substrate may be formed of a blown extruded film and may have a thickness of about 35 to about 60 microns or about 40 to about 45 microns and may be used with a mesh as described below. For example, the tear strength of a 45 micron medium density polyethylene (MPDE) substrate may be about 3 Newtons in the machine (production process) direction, and about 6.5 Newtons in the cross direction. Alternatively, low density (LDPE) or high density polyethylene (HDPE) films may be used as the substrate. HDPE release liners of about 50 micron thickness may be preferable for increased tear strength.

The PSA layers may include a light weight, open mesh of polyester or fibreglass, or other suitable textile or plastic material. The mesh may be formed of polyester strands coated with a thermoplastic resin. The mesh may have about 78 Denier and a density of about 2.88 g/m2, with a rectangular mesh spacing of about 8 mm by 12 mm. A suitable mesh may be obtained from Saint Gobain of Grand Island, N.Y. under product code KPM3210/P3A-3L. Alternatively, a mesh with more strands (and hence increased strength) in the warp direction (as compared to the weft direction) may be used to improve support and release of the PSA in the transverse direction. It is desirable for at least one warp strand (and preferably multiple strands) of the mesh to coincide and align with each of the PSA strips extending in the longitudinal direction. Thus, the warp and weft of the mesh may be generally aligned with the machine and cross-directions, respectively.

The type, size and shape of the mesh may be varied, for example to have a more closed form (i.e. woven at smaller spacing in the warp or weft directions) to provide more support for the PSA layers. One particular function of the mesh is to provide sufficient reinforcing strength to the PSA layers so that the substrate can be easily removed from the PSA layers. If the mesh is more open (i.e. woven at a greater spacing in a warp or weft directions), the risk that the PSA will break increases and can make removal of the substrate more difficult.

The material composition of the substrate and any coatings applied thereto may be selected to achieve a specific ratio of release values between the side on which the PSA is coated and the opposite side of the substrate. Some embodiments may have a ratio of about 3:1 between the release value of the PSA-coated side and the release value of the opposite (non-PSA coated) side, so that if an when the PSA layer is formed into a roll, the PSA substance peels away more easily from the non-coated surface of the adjacent winding layer of the roll, without peeling away from the substrate to which it was originally applied. Such unequal release values from one side of a substrate to another can be referred to as differential release values. For such differential release values, ratios other than about 3:1 may be employed, for example around 2.5:1, 2:1 or 1.5:1. In fact, the differential release values may be as high as nearly 10:1, depending on the materials used. However, for ease of release of the PSA substance from the substrate, particularly in the direction transverse to the longitudinal orientation of the strips, differential release values closer to 1:1 are preferred.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A flooring assembly comprising:
   a) at least one thermoformable short fiber nonwoven material layer;
   b) at least one pressure sensitive adhesive layer including a flexible substrate, a mesh and an adhesive located along the flexible substrate; and
   c) at least one moisture impermeable membrane layer.

2. The flooring assembly of claim 1, including a concrete layer located beneath all other layers.

3. The flooring assembly of claim 1, including a composite layer located above all other layers.

4. The flooring assembly of claim 1, including a first pressure sensitive adhesive layer located in direct planar contact with a first surface of the at least one thermoformable short fiber nonwoven material layer.

5. The flooring assembly of claim 4, including a second pressure sensitive adhesive layer located in direct planar contact with a second surface of the at least one moisture impermeable membrane layer.

6. The flooring assembly of claim 1, wherein the thermoformable short fiber nonwoven material layer is a vertically lapped fibrous material layer.

7. The flooring assembly of claim 1, wherein the at least one moisture impermeable membrane layer is located in direct planar contact with the at least one thermoformable short fiber nonwoven material layer.

8. The flooring assembly of claim 1, wherein the assembly comprises:
   a. exactly one thermoformable short fiber material layer;
   b. exactly one moisture impermeable membrane layer located in direct planar contact with a second surface of the thermoformable short fiber nonwoven material layer;
   c. a first pressure sensitive adhesive layer located in direct planar contact with a first surface of the thermoformable short fiber nonwoven material layer; and
   d. a second pressure sensitive adhesive layer located in direct planar contact with a second surface of the moisture impermeable membrane layer.

9. The flooring assembly of claim 1, wherein the density of the thermoformable short fiber nonwoven material layer is at least about 100 g/m$^2$ and less than about 800 g/m$^2$.

10. The flooring assembly of claim 1, wherein the thermoformable short fiber nonwoven material layer comprises a polyethylene terephthalate material.

11. The flooring assembly of claim 1, wherein the pressure sensitive adhesive layer comprises a UV cured adhesive.

12. The flooring assembly of claim 1, wherein the at least one pressure sensitive adhesive layer includes a release liner.

13. The flooring assembly of claim 1, wherein the assembly is substantially free of any liquid adhesive.

14. The flooring assembly of claim 1, wherein the at least one pressure sensitive adhesive layer adheres to any adjacent layer without use of any solvent.

15. The flooring assembly of claim 1, wherein the at least one pressure sensitive adhesive layer has a high loss factor such that the overall loss factor of the assembly is higher than that of the at least one thermoformable short fiber nonwoven material layer by itself.

16. The flooring assembly of claim 1, wherein the assembly is substantially free of any foam material.

17. The flooring assembly of claim 1, wherein the flooring assembly is applied in between a concrete slab and a wood floor.

18. The flooring assembly of claim 1, wherein fibers of the thermoformable short fiber nonwoven material layer include thermoplastic fibers.

19. The flooring assembly of claim 1, wherein the moisture impermeable membrane layer; comprises a polyamide, a polyolefin, a polycarbonate, a polyester, an epoxy based material, a thermoplastic polyurethane, or any combination thereof.

20. The flooring assembly of claim 1, wherein the moisture impermeable membrane layer comprises a low density polyethylene material.

* * * * *

UNITED STATES PATENT AND TRADEMARK OFFICE
CERTIFICATE OF CORRECTION

PATENT NO. : 10,113,322 B2  
APPLICATION NO. : 15/534093  
DATED : October 30, 2018  
INVENTOR(S) : Colin Shugg et al.

Page 1 of 1

It is certified that error appears in the above-identified patent and that said Letters Patent is hereby corrected as shown below:

In the Claims

Column 12, Line 31:  
Delete "claim 1" and insert -- claim 19 --

Signed and Sealed this  
Eleventh Day of December, 2018

Andrei Iancu  
*Director of the United States Patent and Trademark Office*